(12) United States Patent
Nijhawan et al.

(10) Patent No.: US 7,716,504 B2
(45) Date of Patent: May 11, 2010

(54) SYSTEM FOR RETAINING POWER MANAGEMENT SETTINGS ACROSS SLEEP STATES

(75) Inventors: Vijay B. Nijhawan, Austin, TX (US); Alok Pant, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 817 days.

(21) Appl. No.: 11/457,172

(22) Filed: Jul. 13, 2006

(65) Prior Publication Data

US 2008/0016379 A1  Jan. 17, 2008

(51) Int. Cl.
G06F 1/26 (2006.01)
G06F 1/32 (2006.01)

(52) U.S. Cl. .................................... 713/320
(58) Field of Classification Search ................. 713/320
See application file for complete search history.

(56) References Cited

U.S. PATENT DOCUMENTS

| | | | |
|---|---|---|---|
| 4,969,180 A | 11/1990 | Watterson et al. | 379/58 |
| 5,198,644 A | 3/1993 | Pfeiffer et al. | 235/383 |
| 5,396,635 A | 3/1995 | Fung | 395/800 |
| 5,638,028 A | 6/1997 | Voth | 331/25 |
| 5,710,929 A | 1/1998 | Fung | 395/750 |
| 5,758,175 A | 5/1998 | Fung | 395/750.05 |
| 5,799,198 A | 8/1998 | Fung | 395/750.05 |
| 5,892,959 A | 4/1999 | Fung | 395/750.05 |
| 5,999,730 A | 12/1999 | Lewis | 395/702 |
| 6,079,025 A | 6/2000 | Fung | 713/323 |
| 6,105,141 A | 8/2000 | Hanlon et al. | 713/323 |
| 6,130,603 A | 10/2000 | Briechle | 340/10.34 |
| 6,198,262 B1 | 3/2001 | Squibb et al. | 323/273 |
| 6,243,831 B1 | 6/2001 | Mustafa et al. | 714/24 |
| 6,272,630 B1 * | 8/2001 | Chen et al. | 713/2 |
| 6,360,327 B1 | 3/2002 | Hobson | 713/300 |
| 6,367,024 B1 * | 4/2002 | Ezell | 713/340 |
| 6,459,175 B1 | 10/2002 | Potega | 307/149 |
| 6,529,748 B1 | 3/2003 | Bruner | 455/574 |
| 6,567,921 B1 | 5/2003 | Guziak | 713/322 |
| 6,571,333 B1 | 5/2003 | Jain et al. | 713/2 |
| 6,584,571 B1 | 6/2003 | Fung | 713/310 |
| 6,590,730 B2 | 7/2003 | Veltchev et al. | 360/69 |
| 6,654,896 B1 | 11/2003 | Saunders et al. | 713/323 |
| 6,732,216 B2 | 5/2004 | Shaw | 710/305 |
| 6,760,850 B1 | 7/2004 | Atkinson et al. | 713/320 |
| 6,782,472 B2 | 8/2004 | Jain et al. | 713/2 |
| 6,784,647 B2 | 8/2004 | Nguyen et al. | 323/282 |
| 6,788,963 B2 | 9/2004 | Laroia et al. | 455/574 |
| 6,795,927 B1 | 9/2004 | Altmejd et al. | 713/300 |
| 6,839,854 B2 | 1/2005 | Nguyen | 713/300 |

(Continued)

Primary Examiner—Thomas Lee
Assistant Examiner—Mohammed H Rehman
(74) Attorney, Agent, or Firm—Hamilton & Terrile, LLP; Stephen A. Terrile

(57) ABSTRACT

A method for adjusting power management setting of the operating system while the system is in a sleep state. When a user attaches or removes power to the information handling system while the system is in a standby mode of operation, the sleep state system generates a wakeup event. During the resume process, the operating system checks a current power state of the information handling system and compares the current power state to the power state settings present when the information handling system entered the sleep state, resets the power state settings if necessary and then causes the information handling system to reenter the sleep state.

12 Claims, 3 Drawing Sheets

U.S. PATENT DOCUMENTS

| | | | |
|---|---|---|---|
| 6,845,456 B1 | 1/2005 | Menezes et al. | 713/320 |
| 6,847,892 B2 | 1/2005 | Zhou et al. | 701/213 |
| 6,894,478 B1 | 5/2005 | Fenske | 324/127 |
| 6,906,433 B2 | 6/2005 | Nguyen | 307/31 |
| 6,909,659 B2 | 6/2005 | Lovett et al. | 365/226 |
| 6,925,024 B2 | 8/2005 | Lovett et al. | 365/226 |
| 6,949,921 B1 | 9/2005 | Feight et al. | 324/127 |
| 6,950,952 B2 | 9/2005 | Felsman | 713/310 |
| 6,961,595 B2 | 11/2005 | Laroia et al. | 455/574 |
| 6,973,337 B2 | 12/2005 | Jiguet et al. | 455/574 |
| 2002/0023237 A1* | 2/2002 | Yamada et al. | 713/323 |
| 2003/0153368 A1* | 8/2003 | Bussan et al. | 455/574 |
| 2006/0116744 A1* | 6/2006 | Von Arx et al. | 607/60 |
| 2008/0215908 A1* | 9/2008 | De Haas et al. | 713/502 |

* cited by examiner

SYSTEM FOR RETAINING POWER MANAGEMENT SETTINGS ACROSS SLEEP STATES

BACKGROUND OF THE INVENTION

1. Field of the Invention

The present invention relates to the field of information handling systems, and more particularly to retaining power management settings across sleep states within an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide an information handling system with various power management settings via, for example, the operating system of the information handling system. The power management settings are often used in portable information handling systems.

With portable information handling systems, if a user attaches or removes power while the system is in a sleep state, the operating system has no knowledge that changes have occurred to the system configuration that was present when the information handling system entered the sleep state. Accordingly, the operating system does not change the power policy of the information handling system. Due to this, battery consumption of the system could be much higher than what the user expects.

It would be desirable to provide a way to adjust power management setting of the operating system while the system is in a sleep state.

SUMMARY OF THE INVENTION

In accordance with the present invention, a method for adjusting power management setting of the operating system while the system is in a sleep state is set forth. More specifically, when a user attaches or removes power to the information handling system while the system is in a standby mode of operation, the wakeup system generates a wakeup event. During the resume process, the operating system checks a current power state of the information handling system and compares the current power state to the power state settings present when the information handling system entered the sleep state, resets the power state settings if necessary and then causes the information handling system to reenter the sleep state. In certain embodiments, the operating system sets a wakeup timer which causes the information handling system to wakeup from the sleep state after a predetermined amount of time.

In one embodiment, the invention relates to a method for retaining power management setting across sleep states in an information handling system. The method includes setting an information handling system to operating in a sleep state; monitoring a power condition of the information handling system while the information handling system is operating in the sleep state; generating a wakeup event if a change to the power condition occurs; determining power management settings for the change to the power condition; and, setting the power management settings to apply to the change to the power condition.

In another embodiment, the invention relates to an apparatus for retaining power management setting across sleep states in an information handling system. The apparatus includes means for setting an information handling system to operating in a sleep state; means for monitoring a power condition of the information handling system while the information handling system is operating in the sleep state; means for generating a wakeup event if a change to the power condition occurs; means for determining power management settings for the change to the power condition; and means for setting the power management settings to apply to the change to the power condition.

In another embodiment, the invention relates to an information handling system which includes a processor and memory coupled to the processor, the memory includes a wakeup system for retaining power management setting across sleep states. The wakeup system includes instructions for setting the information handling system to operate in a sleep state; monitoring a power condition of the information handling system while the information handling system is operating in the sleep state; generating a wakeup event if a change to the power condition occurs; determining power management settings for the change to the power condition; and, setting the power management settings to apply to the change to the power condition.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
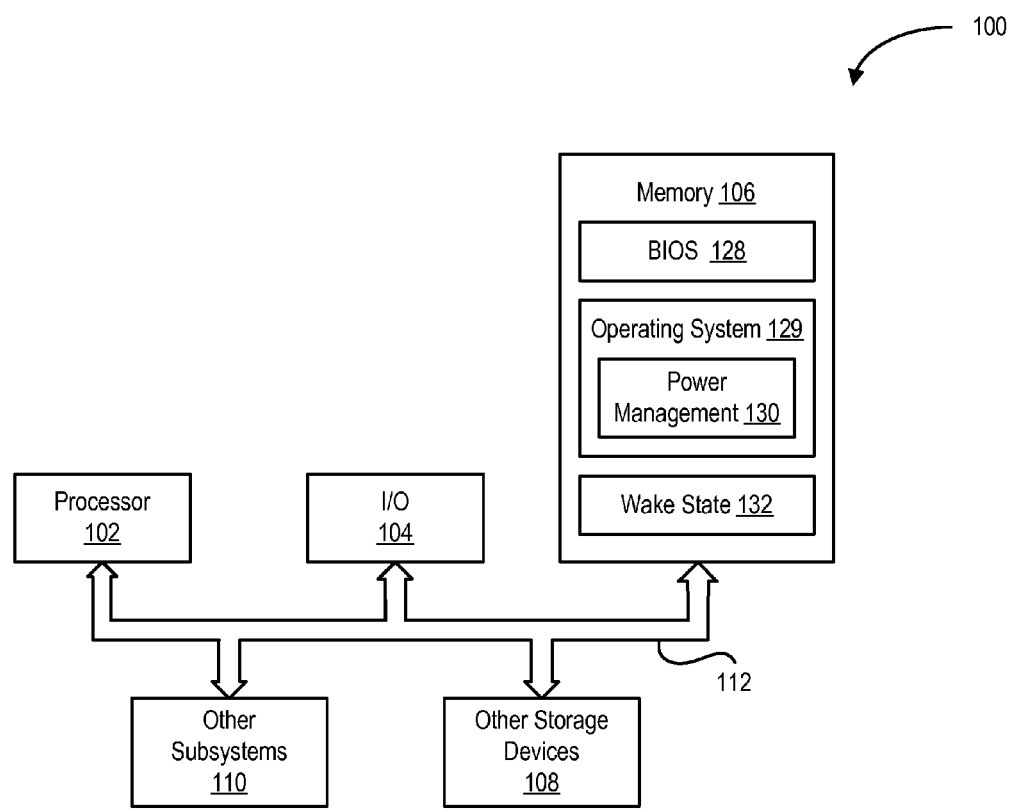
FIG. 1 shows a block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers, memory 106, including volatile memory such as random access memory (RAM) and non-volatile memory such as read only memory (ROM) and hard disk drives, and other storage devices 108, such as a floppy disk and drive or CD-ROM disk and drive, and various other subsystems 110, all interconnected via one or more buses 112. The memory 106 includes a basic input output system 128 as well as an operating system 129 which includes power management system 130. The memory 106 also includes a wake state system 132.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
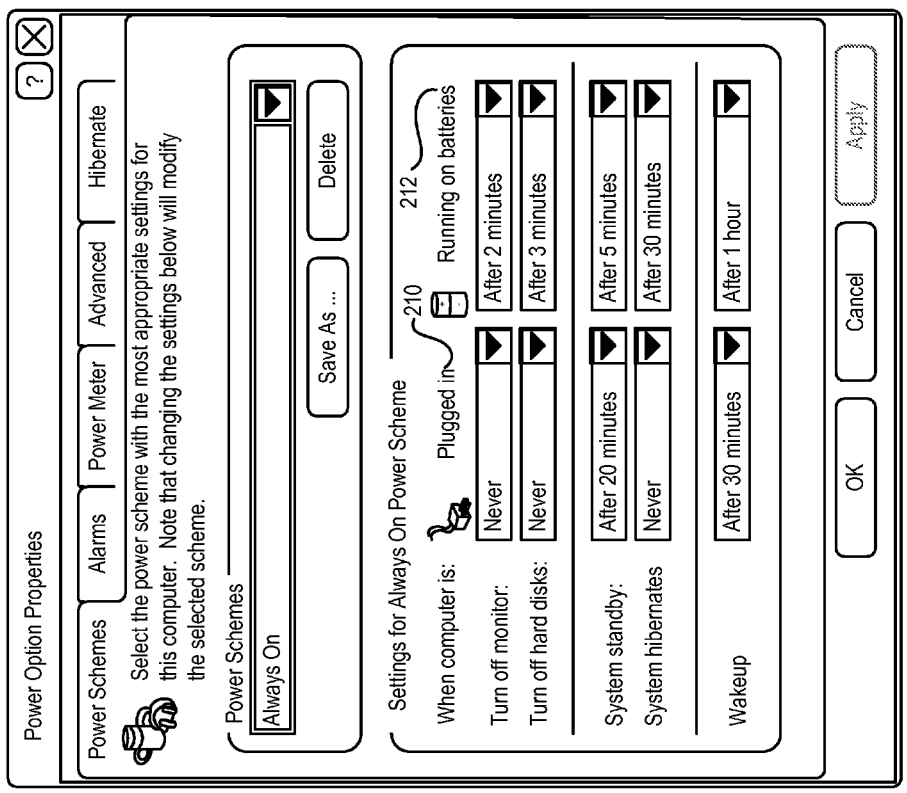
FIG. 2 shows an example screen presentation for a system for retaining power management settings across sleep states.

Referring to FIG. 2, an example screen presentation for a system for retaining power management settings across sleep states is shown. For example, the power management settings includes options for when the information handling system is connected to and running on AC power 210 and for when the information handling system is running on batteries 212. By using the power management settings of the current power condition of the information handling system, i.e., the power management settings associated with when the system is running on batteries or AC power, the information handling system 100 can switch the preferences from one set of power management settings to the other set of power management settings if the power is either connected or removed while the information handling system is in the sleep state. Additionally, the user is presented with an option of how often to wakeup the information handling system to determine whether the power options have changed.

Figure 3:
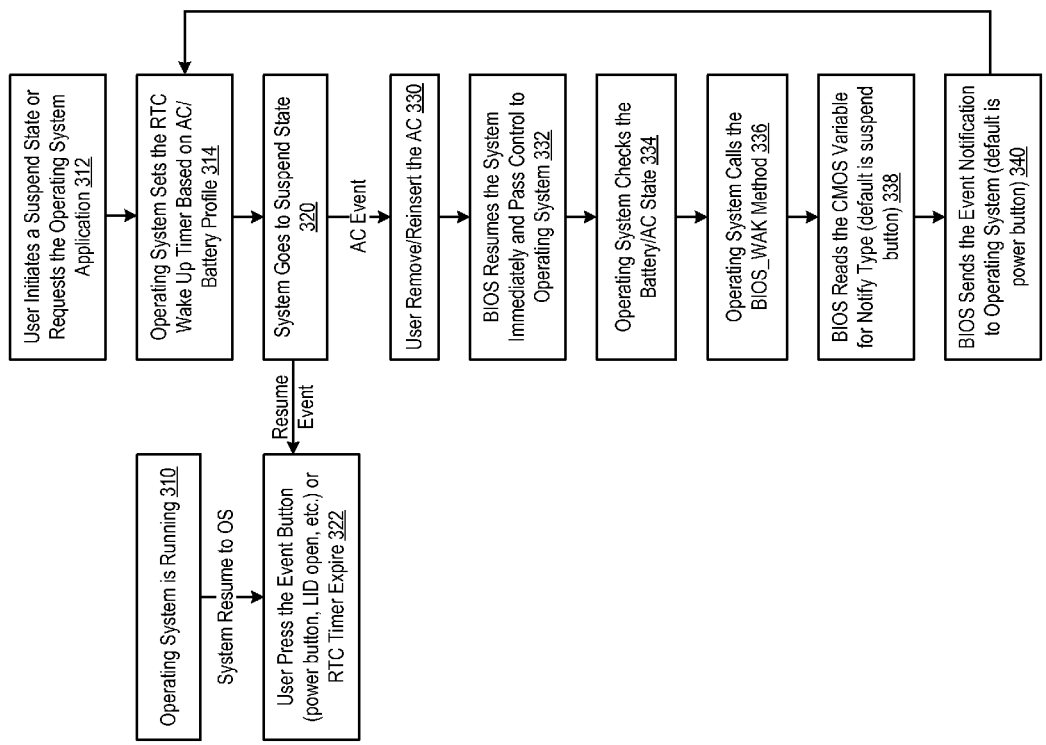
FIG. 3 shows a flow chart of the operation of the system for retaining power management settings across sleep states.

Referring to FIG. 3, a flow chart of the operation of the system 300 for retaining power management settings across sleep states is shown. When a user removes/adds power while the information system is in standby, the system 300 generates a wakeup event. During the resume process, operating system calls a wakeup method (WAK). At this time, the operating system knows that the system is running on batteries by polling a battery state method (BST) in response to the wakeup event. In the wakeup method, the BIOS generates a system control interrupt (SCI) by programming the general purpose I/O (GPIO) within the information handling system. A SCI handler (_Lxx) notifies a default suspend event. The default suspend event is the suspend button press. The BIOS presents an option to user to change the notification to other power management events rather than a default suspend button. For example, a Power Button or other notification device that is configured by a user to cause the operating system to transition to a standby state. The BIOS saves this user choice of a suspend initiator node variable in the non-volatile memory. Thus, the operating system transitions the system back to the standby state, but this time the operating system sets up the wakeup timer after, e.g., half an hour of the system entering standby state so that system resumes after half an hour. Following that resume the operating system takes the system back to hibernate state. This is what the user has selected in their profile for "Running on Batteries". Using the system 300, the power management within the information handling system can follow all the user profiles selected in the Power Options Control tab and allow the system behavior to match this Power Option setting.

More specifically, the system starts operation by the operating system executing at step 310. If a user initiates a suspend state by actuating an event key or the operating system initiates a suspend state at step 312, then the operating system sets a wakeup timer based upon the power options profile at step 314. Next the information handling system 100 transitions to a suspend state of operation at step 320. If a resume event occurs, such as a user actuating a the event button or the timer expiring at step 322, then the system resumes normal operating system operation at step 310.

If a power event occurs, such as power being removed or applied to the information handling system at step 330, then the BIOS causes a wakeup event to be generated and the BIOS passes control to the operating system by jumping to an operating system wake vector at step 332. The wake state system 132 then checks the power state of the information handling system (i.e., whether power is coupled to the system or not) at step 334 and then calls the wakeup method at step 336. During the wakeup method, the BIOS reads a suspend initiator node variable, configured by the user, to determine which device node can cause the system to return to a standby mode of operation. The BIOS then sends a "fake" notification to the operating system that the user selected suspend initiator node (the default is the standby button) is actuated at step 340, which then causes the operating system to set the wakeup timer based upon the AC or batter profile settings at step 314 and transitions to the standby state at step 320.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example as well as large scale data bases or data warehouses. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling submodules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for retaining power management setting across sleep states in an information handling system comprising:
   setting an information handling system to operating in a sleep state;
   monitoring a power condition of the information handling system while the information handling system is operating in the sleep state, the power condition indicating whether power is coupled to the information handling system;
   generating a wakeup event if a change to the power condition occurs;
   determining power management settings for the change to the power condition;
   setting the power management settings to apply to the change to the power condition;
   resetting the information handling system to the sleep state after setting the power management settings to correspond to the change to the power condition; and,
   continuing to monitor the power condition of the information handling system.

2. The method of claim 1 further comprising:
   setting a wakeup timer before resetting the information handling system to the sleep state.

3. The method of claim 2 wherein:
   the resetting the information handling system to the sleep state is affected by generating a suspend event signal.

4. The method of claim 1 further comprising:
   presenting an option for changing the power management settings for each power condition of the information handling system.

5. An apparatus for retaining power management setting across sleep states in an information handling system comprising:
   means for setting an information handling system to operating in a sleep state;
   means for monitoring a power condition of the information handling system while the information handling system is operating in the sleep state, the power condition indicating whether power is coupled to the information handling system;
   means for generating a wakeup event if a change to the power condition occurs;
   means for determining power management settings for the change to the power condition;
   means for setting the power management settings to apply to the change to the power condition;
   means for resetting the information handling system to the sleep state after setting the power management settings to correspond to the change to the power condition; and
   means for continuing to monitor the power condition of the information handling system.

6. The apparatus of claim 5 further comprising:
   means for setting a wakeup timer before resetting the information handling system to the sleep state.

7. The apparatus of claim 5 wherein:
   the resetting the information handling system to the sleep state is affected by generating a suspend event signal.

8. The apparatus of claim 5 further comprising:
   means for presenting an option for changing the power management settings for each power condition of the information handling system.

9. An information handling system comprising:
   a processor;
   memory coupled to the processor, the memory including a wakeup system for retaining power management setting across sleep states, the wakeup system including instructions for
      setting the information handling system to operate in a sleep state;
      monitoring a power condition of the information handling system while the information handling system is operating in the sleep state, the power condition indicating whether power is coupled to the information handling system;
      generating a wakeup event if a change to the power condition occurs;
      determining power management settings for the change to the power condition;
      setting the power management settings to apply to the change to the power condition; and
      resetting the information handling system to the sleep state after setting the power management settings to correspond to the change to the power condition; and,
      continuing to monitor the power condition of the information handling system.

10. The information handling system of claim 9 wherein the wakeup system further includes instructions for:
    setting a wakeup timer before resetting the information handling system to the sleep state.

11. The information handling system of claim 9 wherein:
    the resetting the information handling system to the sleep state is affected by generating a suspend event signal.

12. The information handling system of claim 9 wherein the wakeup system further includes instructions for:
    presenting an option for changing the power management settings for each power condition of the information handling system.

* * * * *